Nov. 29, 1960 — J. E. GROVE ET AL — 2,961,899
DRILLING MACHINE

Filed Aug. 20, 1958 — 3 Sheets-Sheet 2

INVENTOR.
JAMES E. GROVE
WALTER W. DeLANO

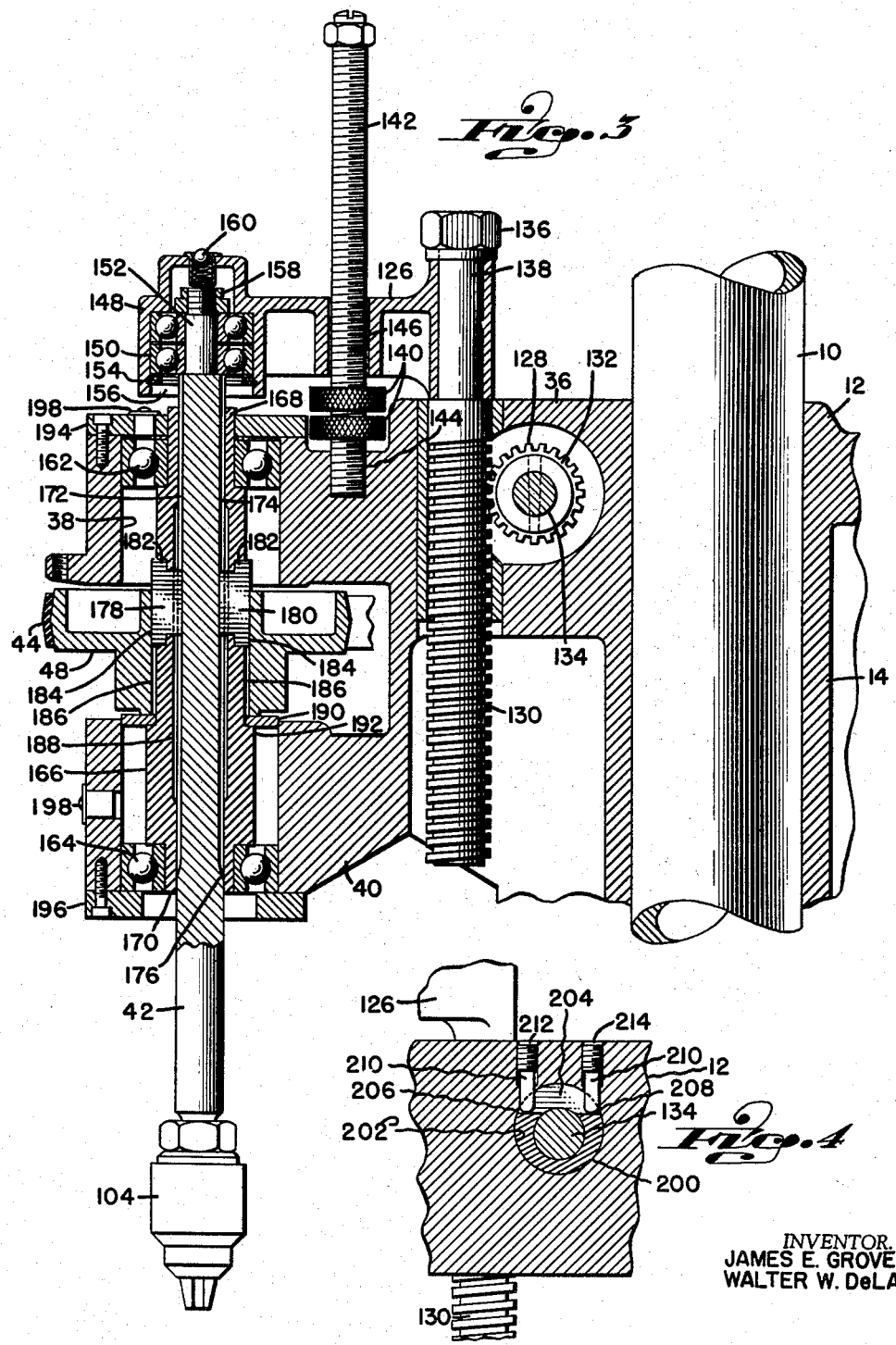

United States Patent Office 2,961,899
Patented Nov. 29, 1960

2,961,899

DRILLING MACHINE

James E. Grove, Hamilton, and Walter W. De Lano, Fairfield, Ohio, assignors to The Hamilton Tool Company, Hamilton, Ohio, a corporation of Ohio Filed Aug. 20, 1958, Ser. No. 756,156

17 Claims. (Cl. 77—29)

This invention relates to improvements in a drilling machine of the infinitely variable speed type, as disclosed generally by Schlichter Patent No. 2,297,078, dated September 29, 1942.

An object of the present invention is to enhance the drilling accuracy of machines of the type referred to, and to prolong the useful life thereof by incorporating certain structural alterations found desirable and effective for the purpose.

Another object is to simplify and expedite assembly and servicing of the spindle structure of the machine when necessary, and to thereby minimize the period of time the machine may be out of service for repair or adjustment.

A further object of the invention is to incorporate improvements in the variable speed drive for the drill spindle, resulting in advantages with respect to lubrication, servicing, and vibrationless operation.

The foregoing and other objects are attained by the means described herein and illustrated upon the accompanying drawings, in which:

Fig. 3 is a fragmentary enlarged cross-sectional view of the improved spindle mounting means.

Fig. 4 is a detailed cross-sectional view of an adjusting means for the spindle feed.

Figure 1:
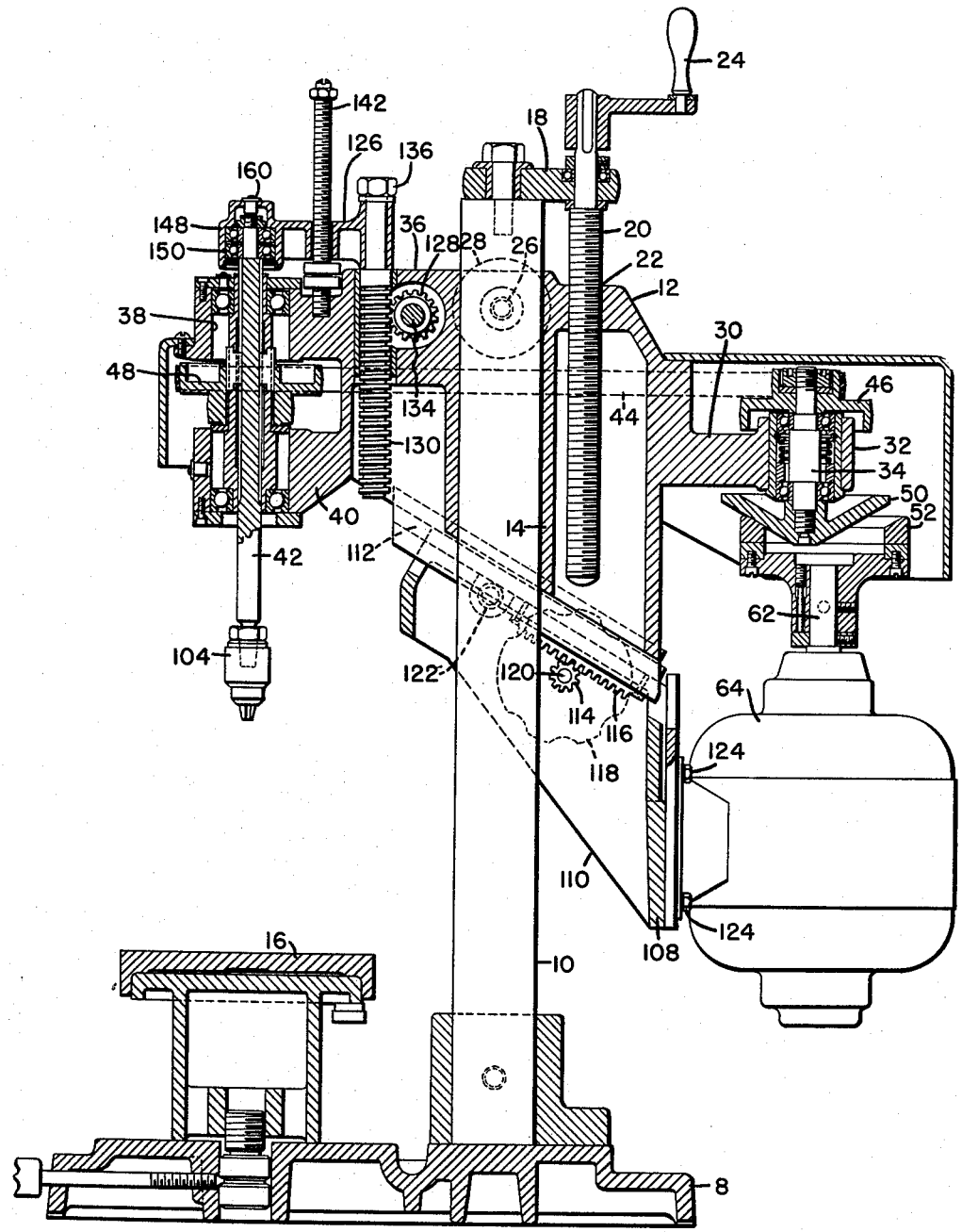
Fig. 1 is a vertical section of a drilling machine embodying the improvements of the present invention.

The drilling machine illustrated may comprise a suitable base 8, upon which is supported a column 10 designed to slidably accommodate a frame 12 carrying the spindle housing and the driving mechanism of the machine. The frame 12 may include a cylindrical portion 14 surrounding the column and adapted for sliding upon the column to various elevations above a work support table 16. Frame 12 may be suspended from a fixed link 18 atop the column, by means of a rotatable elevating screw 20 having a threaded connection at 22 with the frame, so that upon rotating the screw by means of a handle 24, the position of the frame 12 upon the column may be selectively established. Fixation of the frame relative to the column may be achieved by means of a clamp screw 26 fitted with a hand wheel or knob 28, in accordance with common practice.

Extending rearwardly from frame 12 is an arm or bracket 30, having a vertically bored end portion 32 accommodating the drive shaft 34 and associated power transmission mechanism to be described. An oppositely extending bracket or arm 36 of frame 12 may be bored vertically at 38 to provide a spindle housing 40 in which the spindle 42 may rotate and reciprocate in performing a drilling operation. The spindle may be driven by means of a belt 44 trained over the stepped pulleys indicated at 46 and 48.

Figure 2:
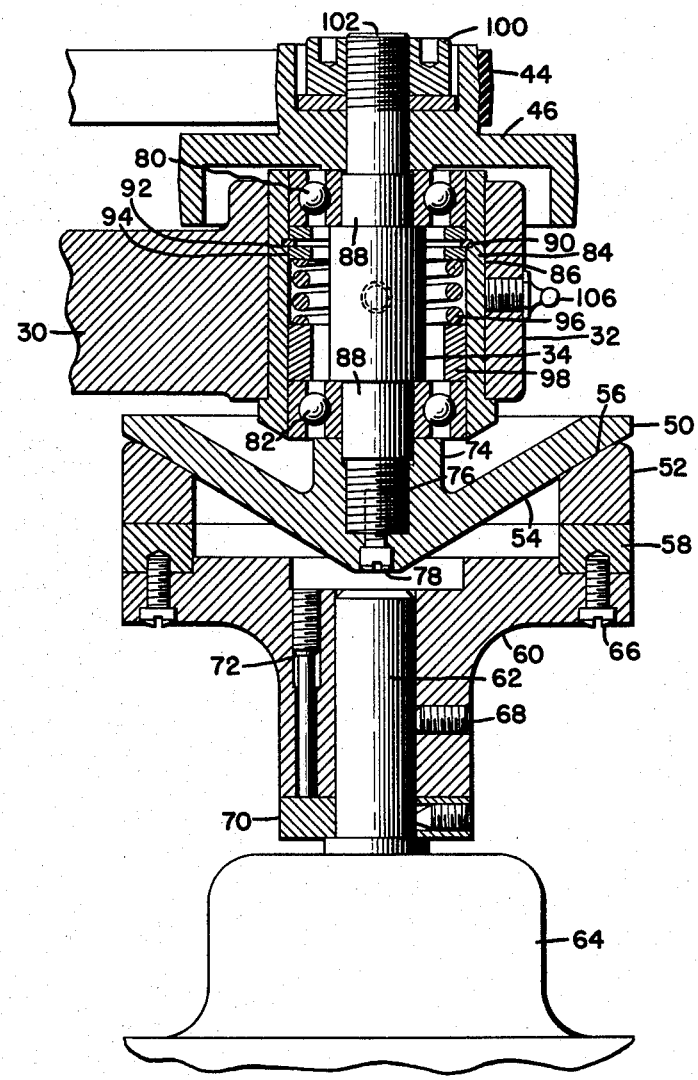
Fig. 2 is a fragmentary enlarged cross-sectional view of the variable speed drive for the drill spindle.

Drive pulley 46 and the shaft 34 to which it is fixed, are adapted to be driven at selected speeds by means of a variable drive mechanism shown in Figs. 1 and 2, and comprising a pair of relatively adjustable friction drive members 50 and 52. Member 50 may be in the form of a cone suitably fixed to the lower end of drive shaft 34, and having its conical friction face 54 in firm contact upon the complementary friction face 56 of drive member 52. Member 52 is in the form of a circular band or ring whose diameter may approximate that of the cone, the ring having a circular base member 58 of rigid material cemented or otherwise fixed thereto, and adapted for mounting upon a hub element 60 attached to the shaft 62 of motor 64. Screws 66 or other suitable fastening devices may detachably fix the friction ring to hub element 60, and the latter in turn may be fixed to shaft 62 by means of one or more set screws 68 and a locking collar 70, the latter being herein shown equipped with a clamping device 72 for the collar.

Cone 50 may have a hub 74 concentrically bored and internally threaded as at 76, to engage the lower threaded end of drive shaft 34, the connection preferably being locked as by means of a screw 78. Bearings for rotationally supporting the shaft upon arm 30 are indicated at 80 and 82. The bearings occupy the opposite end portions of a sleeve 84 supported within the vertical bore 86 of arm 30, and the inner race of each bearing supports the shaft at the reduced portions 88 of the shaft.

The outer race of the upper bearing 80 is restrained against movement downwardly within sleeve 84 by the split ring 90 fitted into an annular groove 92 of the sleeve. Beneath the split ring or abutment 90, is a washer 94 which forms a seat for the upper end of a helical compression spring 96. The lower end of the spring abuts a loose bushing 98 which may slide axially within the sleeve 84 to transmit the downward force of spring 96 to the bearing 82, thereby to constantly urge the drive shaft and cone 50 axially toward the friction ring element, for maintaining friction drive engagement of the cone upon the ring.

Downward shifting of the drive shaft 34 is limited by the pulley 46, which is tightened against the inner race of bearing 80 by means of a nut 100 threaded upon the upper end 102 of the shaft. The pulley may have a key connection with the shaft, if desired.

With reference to Fig. 2, it will be understood that the shaft of motor 64 drives the hub 60 and the friction ring 52 fixed thereon, and the ring transmits its movement to the cone 50 which is yieldingly pressed against the ring at all times by spring 96. The shaft 34 to which the cone is fixed, will therefore rotate the pulley 46 which in turn transmits rotation to the spindle pulley 48 by way of the endless belt 44, for rotating the spindle and any tool held by chuck 104.

It is noteworthy, with reference to Fig. 2, that all parts of the friction drive which may require lubrication or adjustment, are supported by the frame or head of the machine, rather than by the driving motor. This makes possible the use of grease fittings such as 106 which are stationary, and therefore always ready to receive lubricant, whether or not the driving motor is operating. In addition, a highly desirable simplification of the ring structure including the member 60 is achieved, without materially complicating the mounting for drive shaft 34. By interposing the spring means 96 into the space between the drive shaft bearings, the friction elements 50—52 are maintained in driving contact simply and effectively, with the use of a minimum number of parts, and without resort to highly accurate and extensive machining operations. The nature of the concentric spring and bearing assembly is such as to present no problems of imbalance and vibration, either during or after assembly, so that smooth and noiseless operation of the drive mechanism is assured.

In order to vary the speed at which the pulley shaft 34 is rotated by the motor shaft, means is provided for bodily shifting the motor 64 laterally, as indicated upon Fig. 1. As will be understood, the ring 52 will drive the cone 50 at progressively higher speeds as the motor and the ring are displaced to the right in Fig. 1. Conversely, shifting of the motor and ring 52 to a position at which the shafts 34 and 62 are axially aligned, as in Fig. 2, will necessarily result in a direct 1:1 drive, at which the shafts rotate at a common speed. Various spindle speeds are obtainable by shifting the motor bodily as stated, and additional speeds are available by training the belt 44 over different steps of the pulleys 46 and 48.

To provide for bodily shifting the motor 64 and its associated friction drive ring 52, the motor may be mounted upon an upright wall 108 of a carriage 110, the latter being obliquely shiftable in ways 112 carried by the lower portion of frame 12. Movement of the carriage lengthwise of the ways may be effected by means of manually rotatable pinion 114 on the carriage, intermeshed with a rack 116 carried by the frame 12. A knob 118 for rotating the pinion is shown fixed to the pinion shaft 120, as a typical form of means to shift the carriage and the motor 64. The character 122 indicates any acceptable form of clamp means to fix the carriage in adjusted positions upon the frame 12.

As will be understood, the inclination of the carriage support ways 112 corresponds to the inclination of the friction faces of members 50 and 52, so that in any shifted position of the carriage 110 the friction faces will be driving contact with one another for rotating the pulleys 46—48, and the drill spindle 42. The characters 124 indicate screws whereby the base plate of motor 64 may be adjustably positioned upon the carriage wall 108, for proper orientation of the friction drive members 50 and 52.

With reference now to Figs. 1 and 3, attention is directed to the improved spindle mount assuring extreme accuracy of spindle rotation, free of vibration, and providing for easy assembly and servicing when necessary. The spindle 42 is reciprocable vertically relative to housing 40, by means of a suspension arm 126 having connection with the upper end of the spindle, and adapted to be elevated and lowered by means of a rack and pinion assembly indicated generally at 128. The rack may be in the form of a reciprocable screw 130 having its threads engaged by the teeth of pinion 132, so that rotation of the shaft 134 upon which the pinion is fixed, imparts elevating and lowering movements to the spindle suspension arm 126. As will be understood, a nut 136 or other suitable fastener secures arm 126 rigidly to the upper end 138 of the spindle elevating rack, and movement of the arm to a lower limit may be determined by means of stop nuts 140 adjustable along the length of a screw 142 anchored at 144 in the body of the spindle housing. The stop screw may be loosely received in a vertical bore 146 of arm 126.

The shaft 134 of pinion 132 may be equipped with the usual lever or handwheel, not shown, whereby the operator may manually elevate and lower the spindle and the tool relative to the work table.

The free end 148 of arm 126 carries suitable means for rotatably suspending the spindle 42. Such means may comprise one or more anti-friction bearings 150 mounted upon the reduced end portion 152 of the spindle, the bearings resting upon an annular ring 154 fixed within the bearing housing 156 of the arm. A nut 158 screwed onto the threads at the upper terminal end of the spindle, secures the bearings 150 in position upon the spindle. An oiler for the bearings is indicated at 160.

The spindle main bearings are indicated at 162 and 164, and these are widely spaced apart within the vertical bore 38 of the spindle housing. It should be noted that the main bearings 162 and 164 have no direct contact with the drill spindle, but instead, provide rotational support for a spindle sleeve 166 in which the spindle may be reciprocated while rotating with the sleeve. Main bearing 162 surrounds and supports the reduced upper end portion 168 of the sleeve, while the main bearing 164 similarly supports for rotation the reduced lower end portion 170 of the sleeve. The bearings are located preferably at the upper and lower limits of the spindle housing bore 38, so as to have a maximum span between the bearings, in the interest of most effective rotational support of the sleeve and its spindle.

Throughout the major portion of its length, the spindle 42 is provided with a pair of longitudinal diametrically opposed keyways 172 and 174, each terminating at the reduced upper end portion 152 of the spindle. The lower ends of the keyways are indicated at 176, somewhat remote from the chuck 104. Drive keys 178 and 180 are slidingly fitted to the keyways 172 and 174, respectively, so that the spindle may be reciprocated axially while the keys remain at a given elevation within the spindle housing. It should be here noted that the spindle, for purpose of removal from its housing, may be slid downwardly off the keys and out of the sleeve 166, following detachment of the spindle from housing 156, this involving simply the removal of retaining ring 154 to expose the bearings and nut 158, which may be removed quite easily from the upper end portion of the spindle to release the latter for downward displacement from sleeve 166.

The drive keys 178 and 180 extend transversely through opposed elongated slots 182 in the sleeve 166, preferably with a snug fit, and their outermost edges 184 may slidingly engage the pair of diametrically opposed keyways 186 formed inside the hub of pulley 48. By this arrangement, the pulley 48 drives the spindle 42 through the intermediary of keys 178 and 180. It is of importance to note that pulley 48 in no manner contacts the drill spindle, because mounting of the pulley is effected solely upon sleeve 166. The sleeve being relatively short, and large in diameter compared to the spindle, furnishes an axle for pulley 48 which is very sturdy and capable of resisting with certainty any tendency of belt 44 under tension to deflect the sleeve or the spindle therein. To further insure against possible lateral deflection of the spindle by the tension of belt 44, the longitudinal bore of the sleeve may be enlarged as at 188, throughout the major portion of the length of the sleeve intermediate its ends 168 and 170, thereby to provide a longitudinal annular space along the inside of the sleeve precluding contact of the sleeve upon the spindle at all points excepting the sleeve ends, where lateral deflection does not occur.

It may here be pointed out that keys 178 and 180 should have ample clearance with the base portions of keyways 186 and 172, 174, in order to avoid transmitting to the spindle any possible deflection of the pulley 48 laterally, under the pull of belt 44.

Keys 178 and 180 rest in a common plane which includes the longitudinal axis of spindle 42, and the depth of each key exceeds the wall thickness of the sleeve where the keys extend radially through it.

The character 190 indicates an annular flat ring fitted about the sleeve at a shoulder 192, to perform as a dirt seal protecting the lower main bearing 164. The sealing ring may rotate with the sleeve in close proximity to the bore of the spindle housing, above bearing 164, and upon this ring may rest the hub of pulley 48, as shown. Pulley 48, if desired, may have a set-screw connection to sleeve 166, although in practice the keys 178 and 180 have been found adequate to effect the necessary driving connection between the pulley and sleeve 48.

The simple method of displacing spindle 42 from the sleeve 48, has been explained hereinbefore. In the event that both the spindle and the sleeve should require replacement or servicing, these parts are readily removed by simply disconnecting the upper bearing assembly 150 as previously explained, followed by removal of the end plate 196, which allows the spindle and sleeve 166, with its main bearing 164, to drop downwardly from the spindle housing bore 38. In this procedure, the keys 178 and 180 leave the keyways 186 of the pulley hub, thereby to release the pulley for sidewise bodily displacement from the housing 40. The characters 198 indicate oilers for the main bearings.

Fig. 4 illustrates in detail an eccentric adjustment device for obtaining extremely accurate intermeshing of pinion 132 with the rack screw 130. The shaft 134 of the pinion is shown journalled in an eccentrically bored bushing 200 rotationally mounted in a bore 202 of arm 36. The eccentric bushing may be transversely milled or slotted as at 204, to provide seats 206 and 208 upon which may bear the pintles 210, either of which may be advanced against the seats by rotating the adjustment screws 212 or 214, to rock the bushing in one direction or the other. By this means, the pinion teeth may be very accurately set to the threads of screw 130, for eliminating play or looseness in the spindle feeding mechanism.

In the light of the foregoing explanation, it will be apparent that the drilling machine improvements disclosed result in advances of merit with respect to servicing, and initial assembly as well. Drilling accuracy is greatly enhanced by reason of the fact that spindle deflection laterally by the tension of belt 44 is entirely eliminated. The structure employed for this purpose serves also to ensure such vibrationless and noiseless operation of the apparatus as is necessary to the performance of precision machining, and part of the credit for this may be attributed to the improvements related herein concerning the variable friction drive. The several improvements disclosed contribute collectively to effect production of a drilling machine which will render trouble-free service to an extent heretofore unattained in the art.

It is to be understood that various modifications and changes in the structural details of the machine may be incorporated, within the scope of the appended claims, without departing from the spirit of the invention.

What is claimed is:

1. In a machine which includes a tool-holding spindle, the combination of means supporting the spindle for rotational movement and including a rotatable elongate sleeve having opposite end portions embracing the spindle, and an intermediate portion spaced from the spindle, a power transmission element mounted upon the intermediate portion of the sleeve for rotation therewith, motor driven means for imparting rotation to said power transmission element while imposing upon said element a force tending to laterally deflect the sleeve, and means insensitive to lateral deflection of the sleeve, for imparting rotational movement of said power transmission element to said spindle.

2. In a machine which includes a tool-holding spindle, the combination of an elongate sleeve surrounding the spindle, the sleeve having opposite end portions slidably embracing the spindle, and an intermediate portion spaced substantially from the spindle, means rotationally supporting the sleeve near its opposite end portions, a power transmission element mounted upon the intermediate portion of the sleeve for rotation therewith, motor driven means for imparting rotation to the power transmission element while imposing upon said element and said sleeve a force tending to laterally deflect said sleeve, the sleeve having a lateral slot therein intermediate the sleeve end portions, a key in said slot and having edges exposed interiorly and exteriorly of the sleeve, and means providing a driving connection between the power transmission element and the exterior edge of the key, and a second driving connection between the spindle and the interior edge of the key, said driving connections being loosely coupled to avoid transmitting to the spindle the lateral deflections of the sleeve and the power transmission element carried thereby.

3. The combination as set forth in claim 2, wherein the driving connections include longitudinally extending complementary keyways in the spindle and in the power transmission element, and the edges of the key slidingly enter the keyways short of contacting the bases thereof.

4. A machine comprising in combination, a tool-holding spindle grooved longitudinally to provide a keyway having a base, an elongate sleeve surrounding the spindle, the sleeve having opposite end portions slidably embracing the spindle, and an intermediate portion spaced substantially from the spindle, said intermediate portion being transversely apertured to receive a driving key, means rotationally supporting the sleeve near its opposite end portions, a power transmission wheel mounted upon the intermediate portion of the sleeve for rotation therewith, and having an axial bore grooved longitudinally to provide a keyway having a base, a driving key supported in the transverse aperture of the sleeve and having inner and outer edges slidingly received respectively within the keyways of the spindle and the power-transmission wheel, the key edges having clearance space at the bases of the keyways rendering the key ineffective to transmit lateral deflection of the wheel and the sleeve to the spindle, a rotatable driving shaft, and means for transmitting rotational movement of the driving shaft to the power transmission wheel.

5. A machine comprising in combination, a tool-holding spindle grooved longitudinally to provide a keyway having a base, an elongate sleeve surrounding the spindle, the sleeve having opposite end portions slidably embracing the spindle, and an intermediate portion spaced substantially from the spindle, said intermediate portion of the sleeve being transversely apertured to receive a driving key, bearing means supporting the sleeve near its opposite end portions for rotation axially, a power transmission wheel mounted upon the intermediate portion of the sleeve for rotation therewith, and having an axial bore grooved longitudinally to provide a keyway having a base, a driving key supported in the transverse aperture of the sleeve and having inner and outer edges slidingly received respectively within the keyways of the spindle and the power transmission wheel, the distance between the inner and outer edges of the key being sufficiently less than the distance between the keyway bases to render the key ineffective for transmitting lateral deflection of the wheel and the sleeve to the spindle, and means for rotating the power transmission wheel.

6. The combination as set forth in claim 5, wherein the means last mentioned is in the form of a driving belt imposing lateral pull upon the power transmission wheel transversely to its axis of rotation.

7. The combination as set forth in claim 5, wherein the means last mentioned imposes lateral strain upon the power transmission wheel transversely to its axis of rotation.

8. In a device of the class described, the combination of a tool-holding spindle grooved longitudinally to provide a keyway having a base, an elongate sleeve surrounding the spindle, the sleeve having opposite end portions slidably embracing the spindle, and an intermediate portion spaced from the spindle a greater distance than the spacing between the spindle and the sleeve at the opposite end portions thereof, said intermediate portion of the sleeve being transversely apertured to receive a driving key, a frame including bearing means supporting the sleeve near its opposite end portions for axial rotation of the sleeve, a power transmission wheel slidably mounted coaxially upon the intermediate portion of the sleeve and having an axial bore grooved longitudinally to provide a keyway having a base, means on the frame for reciprocating the spindle axially through the sleeve, and means precluding reciprocation of the sleeve and the power transmission wheel with the spindle, a driving key supported in the transverse aperture of the sleeve and having inner and outer edges slidingly received respectively within the keyways of the spindle and the power transmission wheel, the distance between the inner and outer edges of the key being sufficiently less than the distance between the keyway bases to render the key ineffective for transmitting lateral deflection of the wheel to the spindle, and driving means for the wheel imposing incidental lateral strain upon the wheel transversely to its axis of rotation.

9. The combination as set forth in claim 8, including means detachably suspending the spindle within the sleeve, and wherein the keyway of the spindle is open at one end of the spindle, for release of the spindle from the key upon axial bodily displacement of the spindle in one direction from the sleeve.

10. In a device of the class described, the combination of a tool-holding spindle grooved longitudinally to provide an open-ended keyway having a base, an elongate sleeve surrounding a portion of the spindle, the sleeve having opposite end portions slidably embracing the spindle, and an intermediate portion spaced from the spindle a greater distance than the spacing between the spindle and the sleeve at the opposite end portions thereof, said intermediate portion of the sleeve being transversely apertured through the sleeve to receive a driving key, a frame including bearing means supporting the sleeve for axial rotation, a power transmission wheel slidably mounted coaxially upon the sleeve and having an axial bore grooved longitudinally to provide an open-ended keyway having a base, means for reciprocating the spindle axially through the sleeve, and means precluding reciprocation of the sleeve and the wheel with the spindle, a driving key supported in the transverse aperture of the sleeve and having extending inner and outer edges slidingly received respectively within the keyways of the spindle and the power transmission wheel, the distance between the inner and outer edges of the key being sufficiently less than the distance between the keyway bases to render the key ineffective for transmitting lateral deflection of the wheel to the spindle, and driving means for the wheel imposing incidental lateral strain upon the wheel transversely to its axis of rotation.

11. The combination as set forth in claim 10, wherein the bearing means supporting the sleeve is bodily displaceable from the frame, for removal of the sleeve in the direction of reciprocation of the spindle.

12. In a drilling machine of the class described, the combination of a frame having an extending arm bored transversely, and including a portion provided with ways extending obliquely to the axis of said transverse bore, a carriage including means cooperating with the ways of the frame to support the carriage for shifting movement lengthwise of the ways, a motor on the carriage and having a motor shaft disposed in substantial parallelism with the axis of the bore in the arm, a friction drive ring rigidly mounted upon the motor shaft for rotation therewith in concentric relationship, a drive shaft, and means supporting the drive shaft for rotation and limited reciprocation within the bore of the extending arm, a friction drive cone fixed upon one end of the drive shaft, a power transmission wheel fixed upon the drive shaft, and means within the bore of the arm to yieldingly press the cone into frictional driving contact upon the ring in all shifted positions of the carriage.

13. The combination as set forth in claim 12, wherein the means to yieldingly advance the cone is in the form of a helical compression spring surrounding the drive shaft and confined within the bore of the extending arm.

14. In a drilling machine of the class described, the combination of a frame having an extension bored transversely, and including a portion provided with ways extending obliquely to the axis of the bore, a carriage including means co-operating with the ways of the frame to support the carriage for shifting movement lengthwise of the ways, a motor on the carriage and having a motor shaft disposed in substantial parallelism with the axis of the frame extension bore, a friction drive ring rigidly mounted concentrically upon the motor shaft for rotation therewith, a drive shaft, and a power transmission wheel fixed thereon, bearing means in the extension bore supporting the drive shaft for rotation and limited reciprocation axially, a friction drive cone fixed upon one end of the drive shaft in close proximity to the friction drive ring, a fixed abutment member and a slidable bushing housed within the extension bore intermediate the bearing means for the drive shaft, said bushing abutting one of the bearing means, and a helical compression spring intermediate the bushing and the fixed abutment member, for constantly pressing the bushing against said one bearing means in the direction of the cone, to urge the drive shaft and the cone toward the friction drive ring, in all adjusted positions of the carriage.

15. A drilling machine of the class described, comprising in combination, a frame having front and rear extending arms, a spindle rotatably mounted upon the front arm of the frame, a drive shaft rotatably mounted upon the rear arm thereof, a power transmission element, means including a power transmitting belt for imparting rotation of the shaft to the power transmission element, means relieving the spindle of lateral deflection imposed by the belt in driving the power transmission element and imparting rotational movement of said power transmission element to said spindle, a motor having a shaft for actuating the power transmission means, a friction drive ring on the motor shaft, a conical friction drive element on the drive shaft, having a surface in frictional driving relation with the ring, means yieldingly urging the conical drive element constantly into frictional driving relationship with said ring, and means for shifting the ring laterally relative to the conical drive element, for altering the speed ratio of the drive shaft with respect to the motor shaft.

16. In a machine which includes a tool-holding spindle, the combination of means supporting the spindle for rotation, a motor having a rotatable driving shaft, power transmission means for imparting rotation of the motor shaft to the spindle, said power transmission means including a power transmission element having portions thereof completely surrounding but spaced from said spindle, and key driving means drivingly interconnecting said element and said spindle, said key driving means spanning the space between said element and spindle to relieve the spindle of lateral deflection imposed by said power transmission means.

17. Apparatus as defined in claim 16, wherein said spindle is supported for movement both rotationally and axially, and said key driving means spans the space between said element and spindle to relieve the spindle of lateral deflection imposed by said power transmission means in all positions of axial disposition of the spindle.

References Cited in the file of this patent

UNITED STATES PATENTS

| | | |
|---|---|---|
| 1,530,819 | Ensign | Mar. 24, 1925 |
| 1,830,679 | Schenck | Nov. 3, 1931 |
| 2,253,750 | Beier | Aug. 26, 1941 |
| 2,297,078 | Schlichter | Sept. 29, 1942 |